(12) United States Patent
Coushaine et al.

(10) Patent No.: US 7,166,955 B2
(45) Date of Patent: *Jan. 23, 2007

(54) MULTI-CONDUCTOR LED BULB ASSEMBLY

(75) Inventors: Charles M. Coushaine, Rindge, NH (US); Ralph J. Johnson, Bedford, NH (US); Russell Holden, Newburyport, MA (US); John P. Sanroma, Bedford, MA (US)

(73) Assignee: Osram Sylvania Inc., Danvers, MA (US)

( * ) Notice: Subject to any disclaimer, the term of this patent is extended or adjusted under 35 U.S.C. 154(b) by 313 days.

This patent is subject to a terminal disclaimer.

(21) Appl. No.: 10/839,365

(22) Filed: May 5, 2004

(65) Prior Publication Data

US 2005/0067931 A1 Mar. 31, 2005

Related U.S. Application Data

(60) Provisional application No. 60/507,267, filed on Sep. 30, 2003.

(51) Int. Cl.
*H01L 33/00* (2006.01)
*F21V 19/00* (2006.01)
*F21V 23/00* (2006.01)

(52) U.S. Cl. ................. 313/46; 313/498; 362/294; 362/800; 362/545

(58) Field of Classification Search ........... 313/498, 313/46, 512; 362/545, 547, 294, 800
See application file for complete search history.

(56) References Cited

U.S. PATENT DOCUMENTS

| 6,682,211 | B2 * | 1/2004 | English et al. ............ 362/545 |
| 6,773,138 | B2 * | 8/2004 | Coushaine ................. 362/656 |
| 6,793,374 | B2 * | 9/2004 | Begemann ................. 362/294 |
| 6,991,355 | B1 * | 1/2006 | Coushaine et al. ......... 362/555 |
| 2005/0067942 | A1 * | 3/2005 | Coushaine ................. 313/498 |

* cited by examiner

*Primary Examiner*—Karabi Guharay
(74) *Attorney, Agent, or Firm*—William H. McNeil

(57) ABSTRACT

An LED light source (10) has a housing (12) with a base (14) and a hollow core (16) projecting from the base (14), the core (16) being substantially conical. A first printed circuit board (18) is fitted to the base (14). A second printed circuit board (20) is fitted to the narrow end (22) of the core (16), the second printed circuit board (20) having at least one LED (24) operatively fixed thereto. A plurality of electrical conductors 26 is provided having proximal ends (28) attached to and extending from the second printed circuit board (20) and distal ends (30) attached to and projecting through the first printed circuit board (18). A cap (32) is fitted over the second printed circuit board (20) and a heat sink (34) is attached to the base (14) and in contact with the distal ends (30) of the electrical conductors (26). The housing (12) is provided with flanges for engaging a suitable opening in the rear of a reflector.

9 Claims, 3 Drawing Sheets

MULTI-CONDUCTOR LED BULB ASSEMBLY

CROSS-REFERENCE TO RELATED APPLIATIONS

This application claims priority from Provisional Patent Application No. 60/507,267, filed Sep. 30, 2003.

TECHNICAL FIELD

This application relates to light sources and more particularly to light sources employing light emitting diodes (LED or LEDs). Still more particularly, it relates to light sources useful in the automotive field such as for headlights, taillights, stoplights, fog lights, turn signals, etc.

BACKGROUND ART

In the past, most automotive light sources have involved the use of incandescent bulbs. While working well and being inexpensive, these bulbs have a relatively short life and, of course, the thin filament employed was always subject to breakage due to vibration.

Recently some of the uses, particularly the stoplight, have been replaced by LEDs. These solid-state light sources have incredible life times, in the area of 100,000 hours, and are not as subject to vibration failures. However, these LEDs sources have been hard-wired into their appropriate location, which increase the cost of installation. It would, therefore, be an advance in the art if an LED light source could be provided that had the ease of installability of the incandescent light sources.

DISCLOSURE OF INVENTION

It is, therefore, an object of this invention to enhance replaceable light sources.

It is another object of the invention to provide an LED light source that is convenient to use and simple to install, both for the manufacturer initially and for the ultimate consumer in the unlikely event that replacement is necessary.

These objects are accomplished, in one aspect of the invention, by the provision of an LED light source that comprises a housing having a base with a hollow core projecting therefrom. The core is substantially conical. A first printed circuit board is fitted to the base and a second printed circuit board is fitted to the narrow end of the core. The second printed circuit board has at least one LED operatively fixed thereto. A plurality of electrical conductors have proximal ends attached to and extending from the second printed circuit board and have distal ends attached to and projecting through the first printed circuit board. A cap is fitted over the second printed circuit board and a heat sink is attached to the base and in contact with the distal ends of the electrical conductors. While all of the electrical conductors can be functioning electricity carriers, it is also contemplated that some of the conductors can be "dummies" functioning only as carriers for removing heat from the LEDs to the heat sink.

This LED light source is connectable by a simple plug and socket connection, in the same manner as incandescent light sources, thus eliminating the cost and labor of hard-wiring for the manufacturer and easing replacement for the ultimate consumer.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
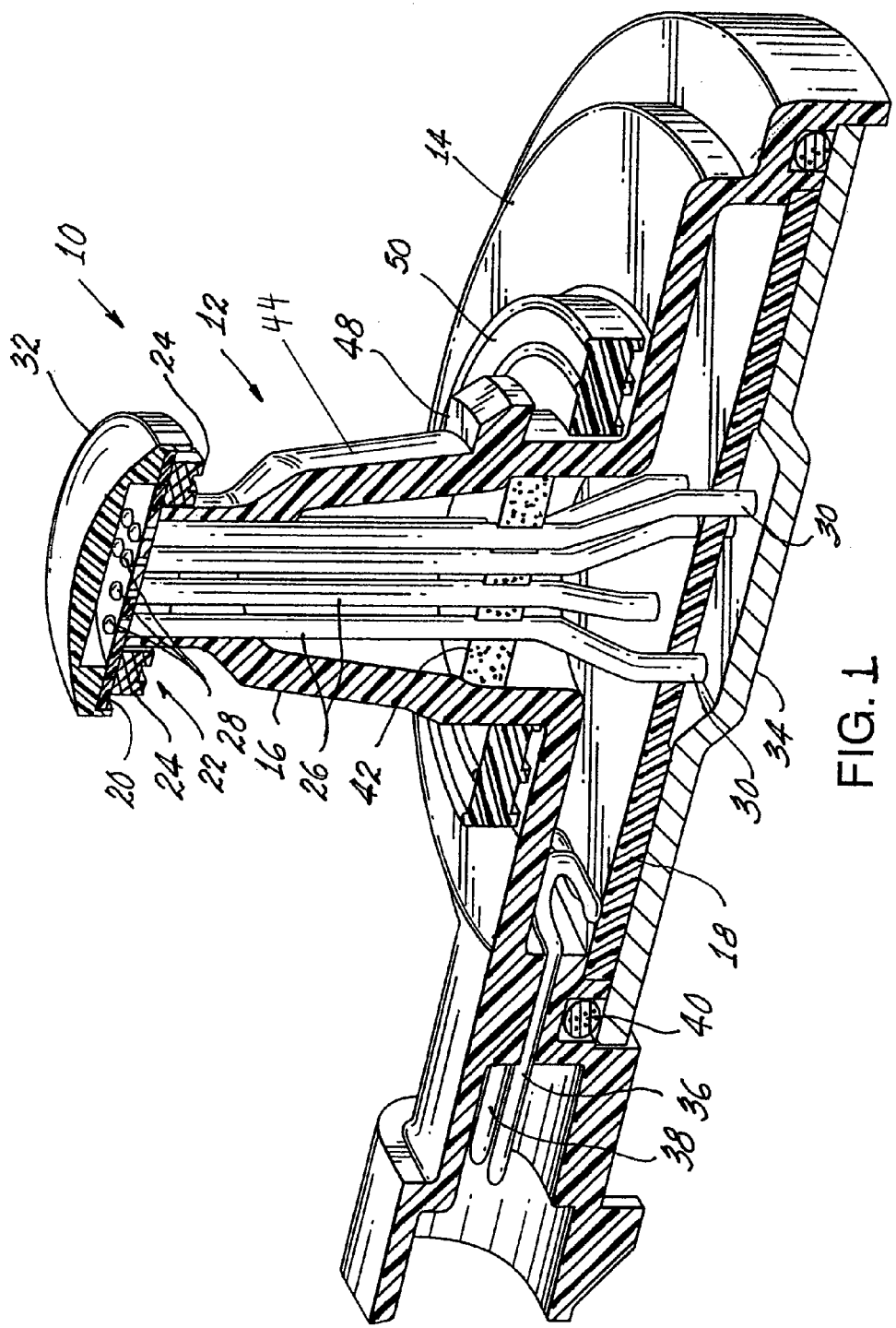
FIG. 1 is a perspective sectional view of an embodiment of the invention.
Figure 2:
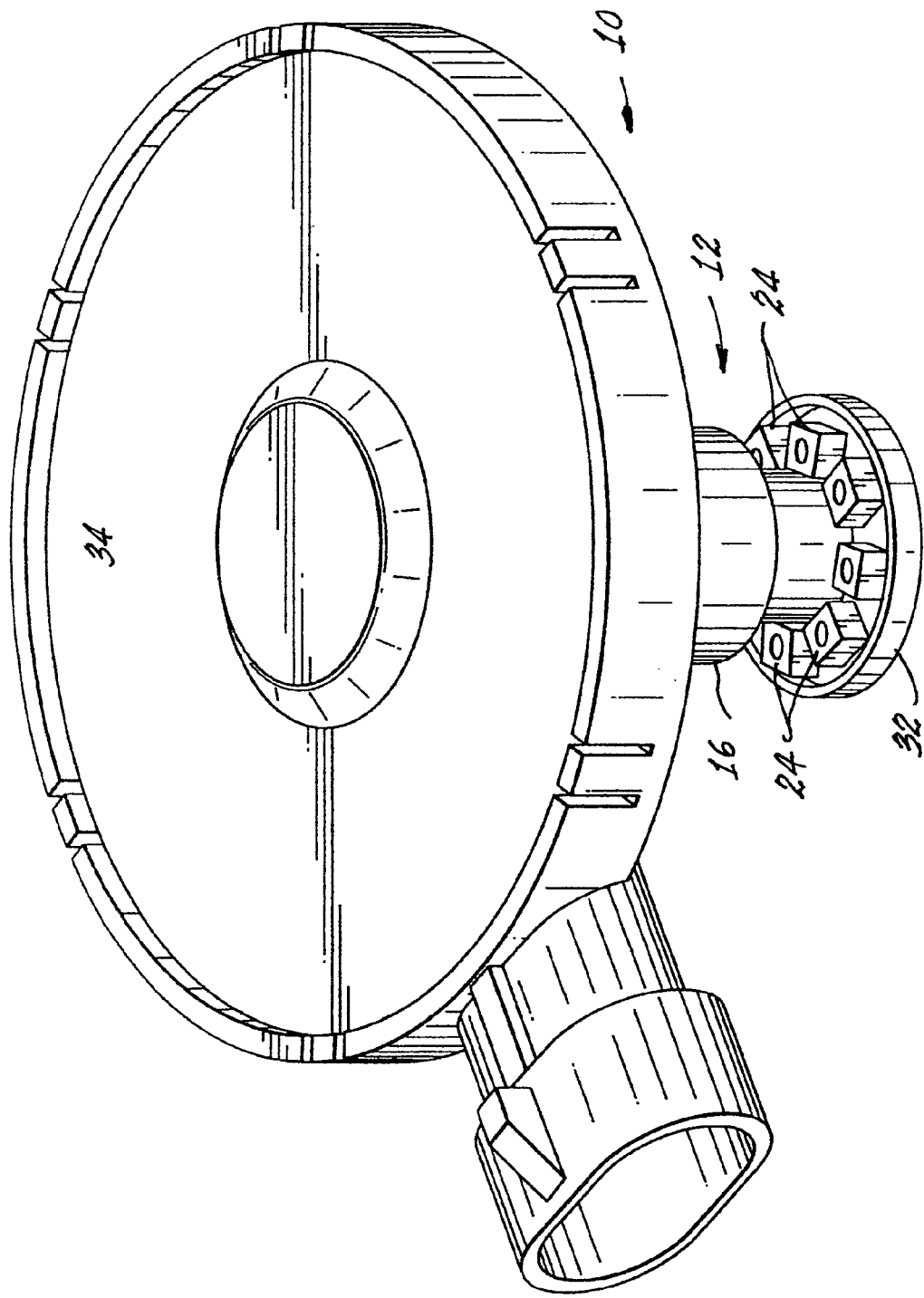
FIG. 2 is a bottom perspective view of the embodiment shown in FIG. 1, illustrating the heat shield.
Figure 3:
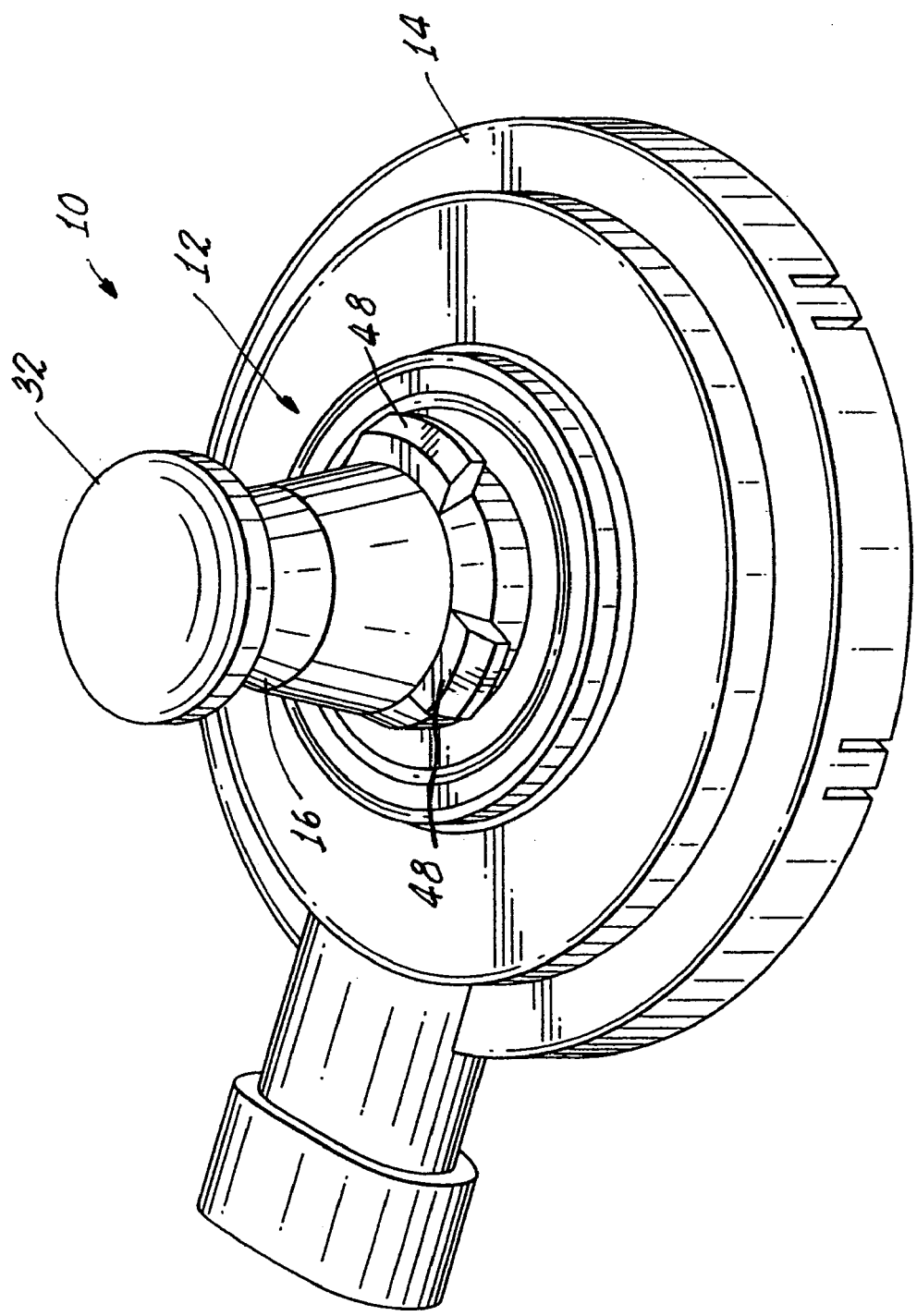
FIG. 3 is a perspective view of the embodiment shown in FIG. 1, illustrating the locking flanges.

Referring now to the drawings with greater particularity, there is shown in FIG. 1 an LED light source 10 that comprises a housing 12 having a base 14 with a hollow core 16 projecting therefrom. The core 16 is substantially conical. A first printed circuit board 18 is fitted to the base 14.

A second printed circuit board 20 is fitted to the narrow end 22 of the core 16, the second printed circuit board 20 having at least one LED 24 operatively fixed thereto.

In the drawings no wiring traces are shown on the printed circuit boards as the specifics of such wiring will depend on the ultimate usage of the light source and can vary widely.

In a preferred embodiment of the invention a plurality of LEDs 24 is used, the number depending upon the ultimate amount of light output desired. The LEDs can all emit the same color or different colors. For example, the LEDs can all emit in the red region of the spectrum if the light is to be used solely as a taillight or stoplight. However, by providing a mixture of red and amber emitting LEDs the light can also function as an amber turn signal, a requirement in some European countries. Alternatively, if all amber emitting LEDs are employed, a typical fog light function can be provided. Also, a mixture of red, green and blue emitting LEDs can provide a white light, for example, for a headlight or backup light.

A plurality of electrical conductors 26 is provided having proximal ends 28 attached to and extending from the second printed circuit board 20 and distal ends 30 attached to and projecting through said first printed circuit board 18. The conductors 26 can carry the electricity needed for the operation of the LEDs, as well as functioning as heat conductors for carrying away the heat generated by the operation of the LEDs, as will be further explained below.

A cap 32 is fitted over the second printed circuit board 20. The cap is preferably formed from a plastic material and can be metallized, as can the outer surface of the core. Alternatively, the cap could also be metal to further dissipate heat.

A heat sink 34 is attached to the base 14. During operation of the lamp the heat generated by the LEDs is conducted thru the rods 26 to distal ends 30 and then is spread across the bottom of the circuit board 18. The heat is then dispensed to the heat sink via thermal putty. A small gap is provided between the circuit board and the heat sink to accommodate the putty.

Electrical contacts extend from inside the housing 12 to a position outside the housing 12 for connection to a power source, for example, to a socket wired in to the automobile's electrical system. Under ordinary circumstances, such as for an automobile taillight, three electrical contacts would be provided. In FIG. 1 only two contacts, 36 and 38 are shown for clarity.

An annular O-ring 40 is positioned between the base 14 and the heat sink 34 to accomplish an environmental seal.

In a preferred embodiment of the invention the hollow core 16 has an electrical conductor aligner 42 positioned therein between the first printed circuit board 18 and the second printed circuit board 20 for maintaining alignment between the electrical conductors 26. The aligner 42 can be formed from rubber or other suitable material. The aligner 42 also acts as a seal from the top side going down the conductors.

Likewise, in a preferred embodiment of the invention the outside surface 44 of the hollow core 16 has multiple diameters. These multiple diameters can provide added control over the light distribution.

One of the diameters near the bottom of the core, that is, near the base, is provided with at least one and preferably three locking flanges 48. These flanges engage a suitable opening in, for example, the base of a reflector, not shown, and allow the light source 10 to be inserted into the opening and twisted to be locked into position.

To insure a tight and proper fit a soft sealing gasket 50 can be provided at the junction of the core with the base to maintain a clean environment inside the reflector.

Thus there is provided an LED light source that is convenient to use and that is easily replaceable.

While there have been shown what are at present considered to be the preferred embodiments of the invention, it will be apparent to those skilled in the art that various changes and modifications can be made herein without departing from the scope of the invention as defined by the appended claims.

What is claimed is:

1. An LED light source comprising:
   a housing having a base;
   a hollow core projecting from said base, said core being substantially conical;
   a first printed circuit board fitted to said base;
   a second printed circuit board fitted to the narrow end of said core, said second printed circuit board having at least one LED operatively fixed thereto;
   a plurality of electrical conductors having proximal ends attached to and extending from said second printed circuit board and distal ends attached to and projecting through said first printed circuit board;
   a cap fitted over said second printed circuit board; and
   a heat sink attached to said base and in contact with said distal ends of said electrical conductors.

2. The LED light source of claim 1 wherein at least two electrical contacts extend from inside said housing to a position outside said housing for connection to a power source.

3. The LED light source of claim 1 wherein an annular O-ring is positioned between said base and said heat sink.

4. The LED light source of claim 1 wherein the outside surface of said hollow core has multiple diameters.

5. The LED light source of claim 4 wherein one of said diameters is provided with a locking flange.

6. The LED light source of claim 1 wherein said at least one LED comprises at least two LEDs.

7. The LED light source of claim 6 wherein said at least two LEDs emit light in the same color.

8. The LED light source of claim 6 wherein said at least two LEDs emit light of different colors.

9. An LED light source comprising:
   a housing having a base;
   a hollow core projecting from said base, said core being substantially conical;
   a first printed circuit board fitted to said base;
   a second printed circuit board fitted to the narrow end of said core, said second printed circuit board having at least one LED operatively fixed thereto;
   a plurality of electrical conductors having proximal ends attached to and extending from said second printed circuit board and distal ends attached to and projecting through said first printed circuit board;
   a cap fitted over said second printed circuit board; and
   a heat sink attached to said base and in contact with said distal ends of said electrical conductors
   wherein said hollow core has an electrical conductor aligner positioned therein between said first printed circuit board and said second printed circuit board for maintaining alignment between said electrical conductors.

* * * * *